(12) United States Patent
Shaffer et al.

(10) Patent No.: US 6,400,389 B1
(45) Date of Patent: *Jun. 4, 2002

(54) APPARATUS FOR LASER MARKING INDICIA ON A PHOTOSENSITIVE WEB

(75) Inventors: Wayne K. Shaffer, Penfield; David C. Press, Webster, both of NY (US); Gregory A. Smith, Fort Collins, CO (US)

(73) Assignee: Eastman Kodak Company, Rochester, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/490,513

(22) Filed: Jan. 25, 2000

(51) Int. Cl.[7] .............................. B41J 15/14; B23K 26/14
(52) U.S. Cl. ................................. 347/241; 219/121.84
(58) Field of Search ................................ 347/224, 225, 347/227, 241, 256; 219/121.6, 121.67, 121.62, 121.73, 121.76, 121.86, 121.68, 121.84

(56) References Cited

U.S. PATENT DOCUMENTS

| | | |
|---|---|---|
| 3,866,398 A | 2/1975 | Vernon, Jr. et al. .......... 134/1.3 |
| 4,027,137 A | 5/1977 | Liedtke .................... 219/121.7 |
| 4,162,390 A | 7/1979 | Kelly ..................... 219/121.63 |
| 4,303,824 A | 12/1981 | Morgan et al. ......... 219/121.84 |
| 4,315,133 A | 2/1982 | Morgan et al. ......... 219/121.84 |
| 4,554,560 A | 11/1985 | Kanaoka et al. ............. 347/259 |
| 4,652,722 A * | 3/1987 | Stone et al. ........... 219/121.76 |
| 5,609,780 A * | 3/1997 | Freedenberg al. .. 219/121.73 |
| 5,940,115 A | 8/1999 | Nakamura et al. .......... 347/251 |
| 6,191,382 B1 * | 2/2001 | Damikolas ............. 219/121.62 |

FOREIGN PATENT DOCUMENTS

| | | |
|---|---|---|
| DE | 198 00 783 A | 7/1999 |
| EP | 0 519 391 A | 11/1985 |

* cited by examiner

Primary Examiner—Hai Pham
(74) Attorney, Agent, or Firm—Clyde E. Bailey, Sr.

(57) ABSTRACT

An apparatus for laser marking indicia on a moving photosensitive web by impinging laser energy upon the moving web with a laser printer device. The laser printer device is provided with a nozzle element that concentrates beams of radiation onto the web with substantially reduced incidences of fog spots on the web. The nozzle element extends circumferentially, substantially around a laser beam tube and the predetermined optical path defined by laser beams emanating from the laser beam tube.

6 Claims, 6 Drawing Sheets

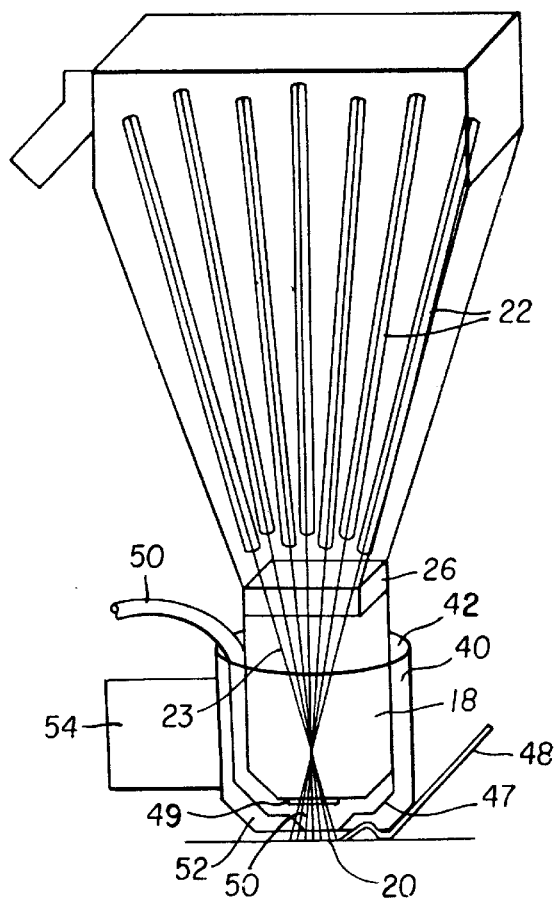
FIG. 2a
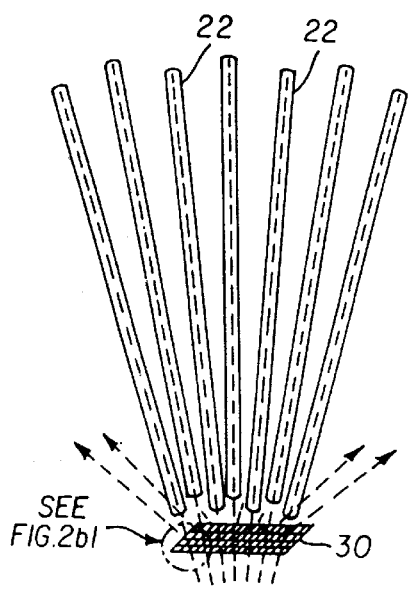
FIG. 2b
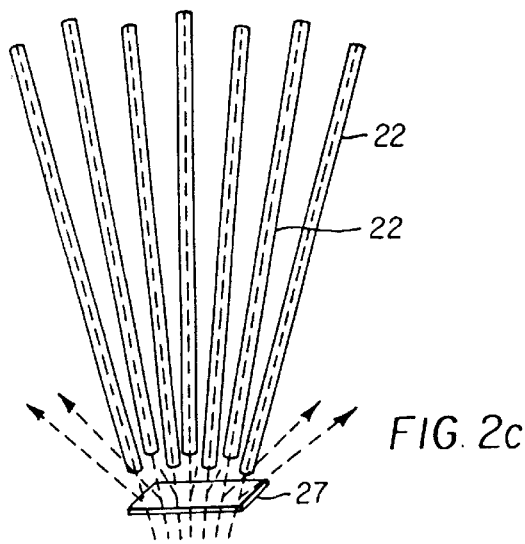
FIG. 2c
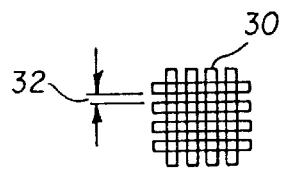
FIG. 2b1

APPARATUS FOR LASER MARKING INDICIA ON A PHOTOSENSITIVE WEB

FIELD OF THE INVENTION

The invention relates generally to the field of laser marking systems. More particularly, the invention concerns an apparatus that uses laser energy for marking indicia on photosensitive web with a dramatic reduction in the occurrence of fog on the photosensitive web.

BACKGROUND OF THE INVENTION

Conventional edge marking in photographic film manufacturing involves printing some sort of identification indicia along the edge of film rolls during the finishing operation. Edge marked film has direct verification of roll identity, sheet identity and waste identity during all stages of the manufacturing process. Importantly, edge marked film provides accurate footage identification that enables operators to quickly identify, trace and remove film imperfections, thereby minimizing the amount of product waste. More generally, edge marked film increases process understanding by allowing process interactions to be more closely identified with their corresponding effect on the product. Traditional embossing marking techniques are being replaced by laser edge marking. Current mechanical embossing techniques (embossing wheels) are not programmable, generate poor quality marks and require excessive maintenance. Laser edge marking, on the other hand, is particularly advantageous in the industry because it provides a permanent record and can be read before and after film processing.

Advances in laser technology enabled the use of a dot matrix $CO_2$ laser marking system to be used to replace existing embossing technology. Off the shelf laser marking equipment will mark the film at required throughput rate, however, an unacceptable level of fog spots occurred.

Thus, a particular shortcoming of these advanced high powered laser systems used for edge marking photosensitive film is that they produce a by-product that impinges on the film surface. Laser energy by-products in the form of a plume of energized smoke and irradiated debris on the film surface is known to cause the localized fogging on the film. Experience has shown that localized fogging is not easily eliminated even when the film is immersed in a 99.8% nitrogen atmosphere.

More recent developments in laser technology enabled the development of high speed marking systems using short pulse lasers. Short pulse laser exposure on photosensitive film shows some promise in reducing the occurrences of fog spots. Our experience also indicates that an air jet directed at the laser impingement point on the film surface further reduce the occurrence of fog. Statistical methods have been employed to gain information on fog incidence reduction when laser marking photosensitive film. It has been experimentally proven that laser pulse width does not have a significant effect on fog. Importantly, however, our experience does suggest that laser peak power has a dramatic effect on the reduction of occurrences of fog spots by a factor of about 30. In addition, significant statistical benefits can be derived from an air jet that we believe can further reduce the incidences of fog spots by a factor of about 10.

Hence, laser marking without controlling peak power will result in 14% to 50% of the laser-generated dots of dot matrix characters to have fog spots around the dots. There are no present attempts known to the inventors to control peak power in laser edge marking devices because embossing techniques still remain prevalent in the industry and, more importantly, the fog spots remain a significant quality issue during the finishing process.

Therefore, a need persists for variable information to be permanently marked on die edge of each sheet of photosensitive web, such as photographic film, without significant incidences of fog spots on the surface of the film.

SUMMARY OF THE INVENTION

It is, therefore, an object of die invention to provide an apparatus for laser marking indicia on a moving photosensitive web while substantially reducing the occurrence of deleterious fog spots on the photosensitive web.

It is another object of the invention to provide an apparatus for exposing a moving photosensitive web to laser energy while controlling the peak power of the laser energy.

Yet another object of the invention is to provide an apparatus for laser printing indicia on a photosensitive web by further directing a jet of air onto the laser energy impinged surface of the photosensitive web.

It is a feature of the invention that the apparatus for laser marking indicia on a moving photosensitive web has a nozzle element for reducing the incident of fog spots on the laser impinged photosensitive web.

To accomplish these and other objects and features and advantages of the invention, there is provided, in one aspect of the invention, an apparatus for marking indicia on a moving photosensitive web, comprising:

a source of laser energy;

laser printer means operably connected to said source of laser energy, said laser printer means being provided with:
  a laser head;
  a laser beam tube connected to said laser head, said laser beam tube having an active end; and,
  a nozzle element structurally associated with said active end of said laser beam tube, said nozzle element comprising a chamber having a laser energy inlet end and a laser energy outlet end; an air jet member arranged in said chamber for directing a burst of air onto a laser beam impingeable surface; at least one lens arranged in said chamber for focusing each one of a plurality of laser beams passing through said chamber; a lens cleaning member arranged in said chamber proximate to said at least one lens; and, a vacuum port extending from said chamber, said vacuum port providing means for evacuating said chamber of smoke and debris generated during laser marking; and wherein said laser head has a plurality of lasers disposed therein for generating a plurality of laser beams, a lens arranged in said laser beam tube for focusing said each one of a plurality of laser beams along a predetermined optical path through said laser beam tube and into impinging contact with said moving photosensitive web thereby producing said indicia thereon.

It is, therefore, an advantageous effect of the present invention that laser edge markings on photosensitive web can be accomplished with an apparatus that is easy to operate, simple and cost effective to produce and that substantially reduces the occurrence of fog spots on the photosensitive web.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein:

FIG. 2a is a front elevational view of the laser head showing an attenuating member therein;

FIG. 2b1 is an enlarged view of the mesh screen depicted in FIG. 2b;

FIG. 2b is a top elevational view of the mesh screen;

FIG. 2c is an isometric view of the beam splitter;

DETAILED DESCRIPTION OF THE INVENTION

Figure 1:
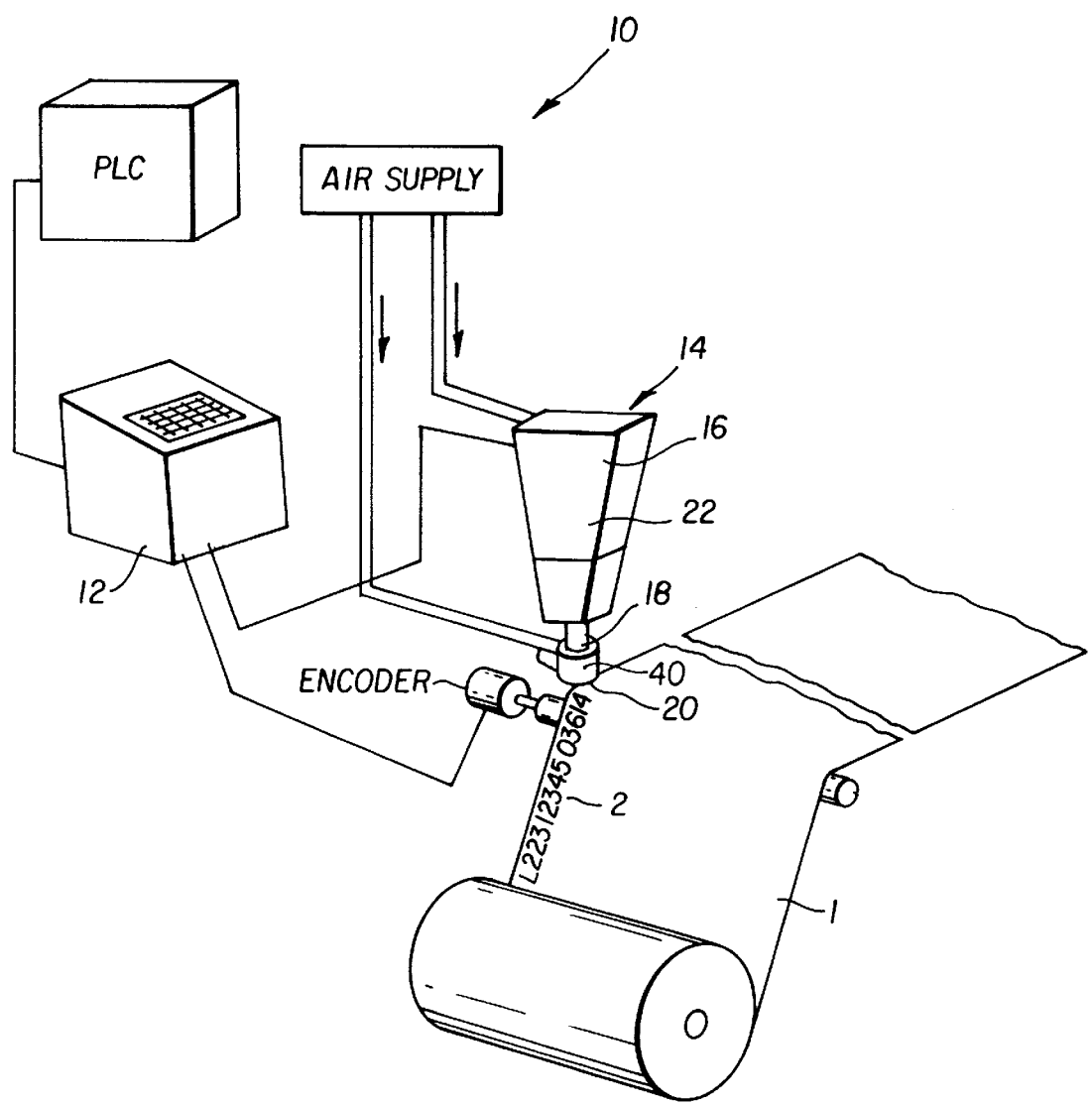
FIG. 1 is a schematic diagram of a laser edge marking system of the invention.

Turning now to the drawings, and in particular to FIG. 1, the apparatus 10 according to the principles of the invention for printing indicia on a moving laser impingeable surface, such as a moving photosensitive web 1, is illustrated. According to FIG. 1, apparatus 10 has a source 12 of laser energy for producing a range of laser power. A laser printer means 14 is operably connected to the source 12 of laser energy.

Referring to FIG. 1, laser printer means 14, preferably a Domino DDC2 Digital Laser Coder, manufactured by Domino Lasers, Inc. of Gurnee, Ill., is provided with laser head 16 and a laser beam tube 18 structurally associated with the laser head 16. Laser beam tube 18 has an active end 20 positioned proximate to the moving photosensitive web 1 and a plurality of lasers 22 disposed in die laser beam tube 18 for generating a plurality of laser beams. Importantly, a nozzle clement 40, described more fully below, is structurally associated with the active end of the beam tube 18, as shown in FIGS. 1 and 2a.

According to FIG. 2a, in the preferred apparatus 10, seven lasers 22 are employed, each being a medium power $CO_2$ laser that operates at about 30 watts maximum power. Each laser 22 corresponds to a row of dots in a dot matrix character. This type of laser 22 has enough power to mark small characters or indicia into photosensitive materials, for example emulsion coated film. At least one lens 49 is arranged in the laser beam tube 18 for focusing each one of the plurality of laser beams along a predetermined optical path 23 and into impinging contact with the laser impingeable material, such as photosensitive web 1 thereby producing indicia thereon.

Referring to FIGS. 2a–2c, means for controlling peak power, preferably a laser beam attenuating member 26 (FIG. 2a), is disposed in the optical path 23 for attenuating the laser beams passing through the laser beam tube 18. In the preferred embodiment, attenuating member 26 is a metallic mesh screen 30 (FIG. 2b) arranged in the laser beam tube 18. Preferably, metallic mesh screen 30 is made of materials selected from the group consisting of brass, steel, copper and metal alloys. We consider copper to be most preferred because it has more suitable thermal conductivity and reflective characteristics of the wavelengths contemplated by the invention. Moreover, the mesh screen 30 has a plurality of openings 32. Openings 32 each have a wire diameter in the range of from about 0.00025 inches (0.000635 cm) to about 0.025 inches (0.0635 cm) and a clear opening having a dimension in the range from about 0.001 inches (0.00254 cm) to about 0.100 inches (0.254 cm). In the preferred embodiment, mesh screen 30 has clear opening dimension of 0.055 inches (0.140 cm), and a wire diameter of 0.016 inches (0.041 cm).

As shown in FIG. 2c, alternatively, attenuating member 26 may include at least one beam splitter 27 arranged along the optical path in the beam tube 18. Moreover, attenuating member 26 may include a neutral density filter (not shown).

Figure 6:
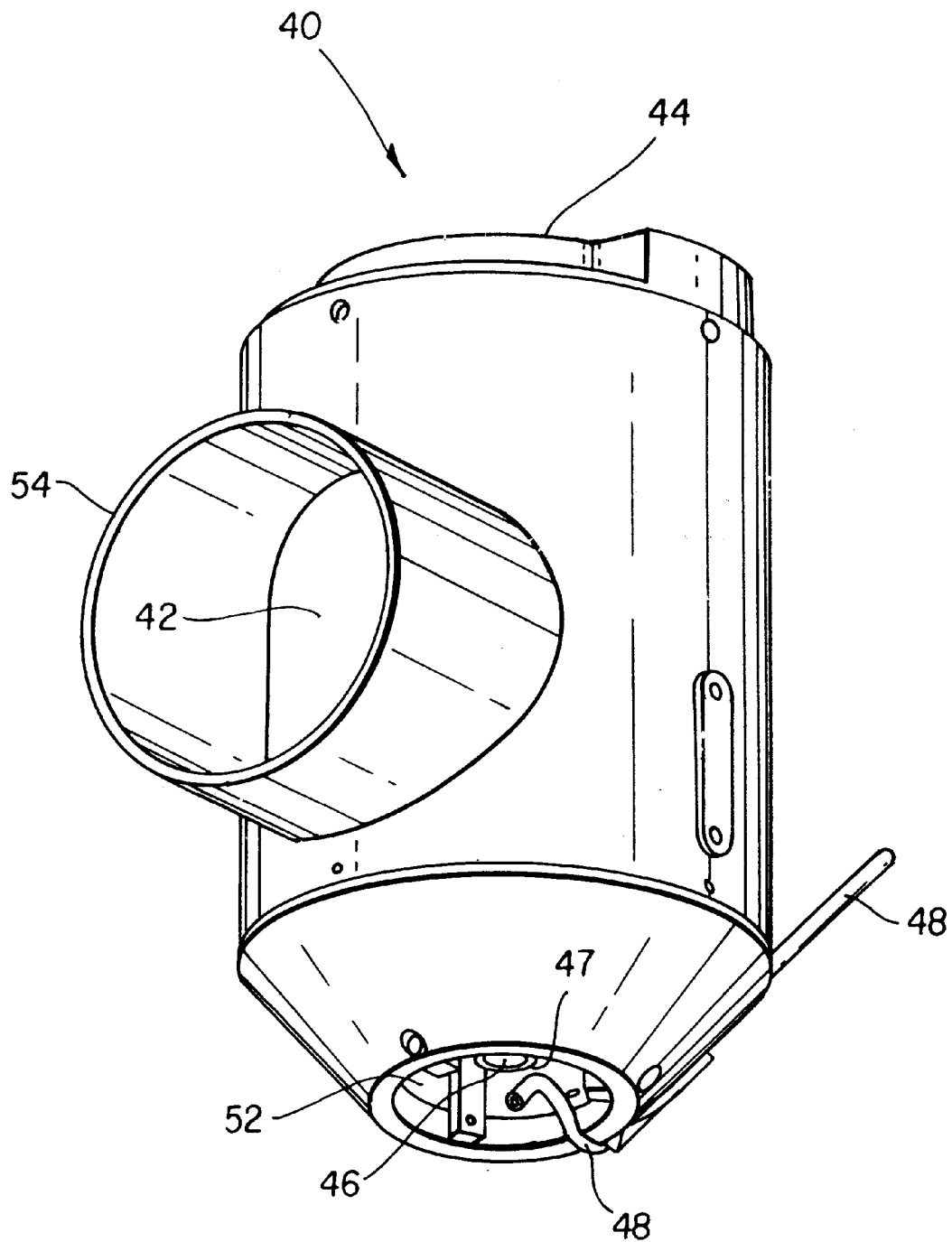

Referring to FIGS. 2a and 6, nozzle element 40 has a preferably generally cylindrical shaped chamber 42 with a laser energy inlet end 44 and a laser energy outlet end 46. Inlet end 44 is adaptable to any laser energy output device, such as a laser marking system for marking indicia on photosensitive web. Laser energy outlet end 46 is configured to focus beams of radiation onto a moving photosensitive web material 1 and to be spaced proximate to the moving photosensitive web material 1. Preferably, laser energy outlet end 46 has a generally conical shape for concentrating the vacuum nearest the photosensitive web material 1 and, a generally conical lip 47 for concentrating the air surrounding lens 49.

Referring to FIGS. 2a and 6, an air jet member 48 is arranged in the chamber 42 near the outlet end 46. Air to air jet member 48 may be supplied by any general source (not shown). Air jet member 48 is configured for directing a burst of air onto a laser beam impingeable surface, such as a photosensitive web material 1 positioned proximate to the air jet member 48.

Referring to FIG. 2a, chamber 42 may have at least one lens 49 arranged therein for focusing each one of a plurality of laser beams passing through the chamber 42. Lens 49 is preferably a short focal length zinc selenide lens. Lens 49 may be mounted in any one of a variety of ways in chamber 42, for instance using a typical lens mount (not shown).

Referring to FIGS. 2a and 6, a lens cleaning member 50 is arranged in the chamber 42 proximate the lens 49. Nozzle element 40 was developed to keep the lens 49 clean, prevent plume and draw away vapors associated with impinging laser energy. In the preferred embodiment, lens cleaning member 50 is a positive air flow pattern surrounding the lens 49 that shields the lens 49 from particulate matter. Alternatively, lens cleaning member 50 may be a burst of air directed at the lens 49 (not shown).

Turning again to FIGS. 2a and 6, chamber 42 further has a vacuum inlet port 52 and a vacuum outlet port 54 in fluid communication with the chamber 42. Vacuum outlet port 54 provides means for evacuating the chamber 42 of smoke and debris generated during laser marking. To concentrate vacuum at a predetermined location, vacuum inlet port 52 preferably has a generally conical shape. Affluence generated by the marking process without vacuum resulted in no detection of cyanide, sulfur dioxide, hydrochloric acid, or carbon monoxide. Carbon dioxide could be detected but the level was below exposure limits. Mercury, silver and aldehydes vapors were adequately removed by the Fumex FA2 fume extraction machine.

Vacuum outlet port 54, is connected to a source of vacuum (not shown), and provides a means for receiving such particulates that are collected through vacuum inlet port 52.

FIG. 2a illustrates nozzle element 40 adapted to a laser beam tube 18 having a plurality of lasers 22 therein. Laser beam tube 18 is preferably the output end of a laser marking system 10 (only partially shown).

Preferably, nozzle element 40 is made from any structurally rigid material such as any metallic material. We prefer using aluminum because it is light-weight and can be easily formed.

Figure 3:
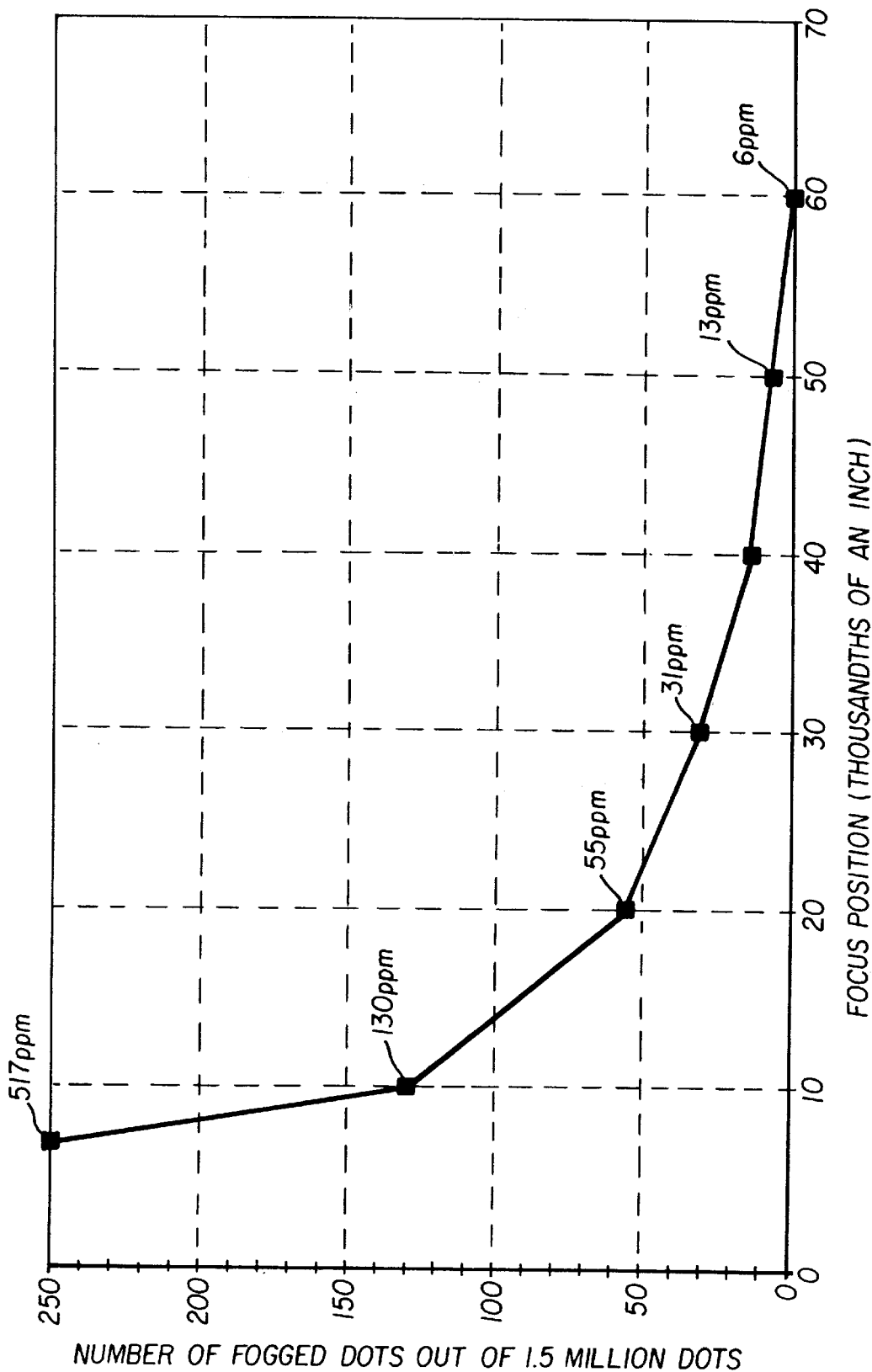
FIG. 3 is a graph of tie relationship between focus position effect (inversely proportional to peak power) on fog spots formed on the photosensitive film.

Referring to FIG. 3, peak power of each of the plurality of lasers 22 was determined to be a primary factor controlling the incidences of fog spots occurring on the photosensitive web material 1 after impingement by laser energy. According to FIG. 3, we observed that the incidences of fog spots decreased as the focus position of the lens 49 moved further out of focus. This corresponded to an effective reduction in peak power that enabled the inventors to select controlling peak power for minimizing the incidences of fog spots.

Figure 4:
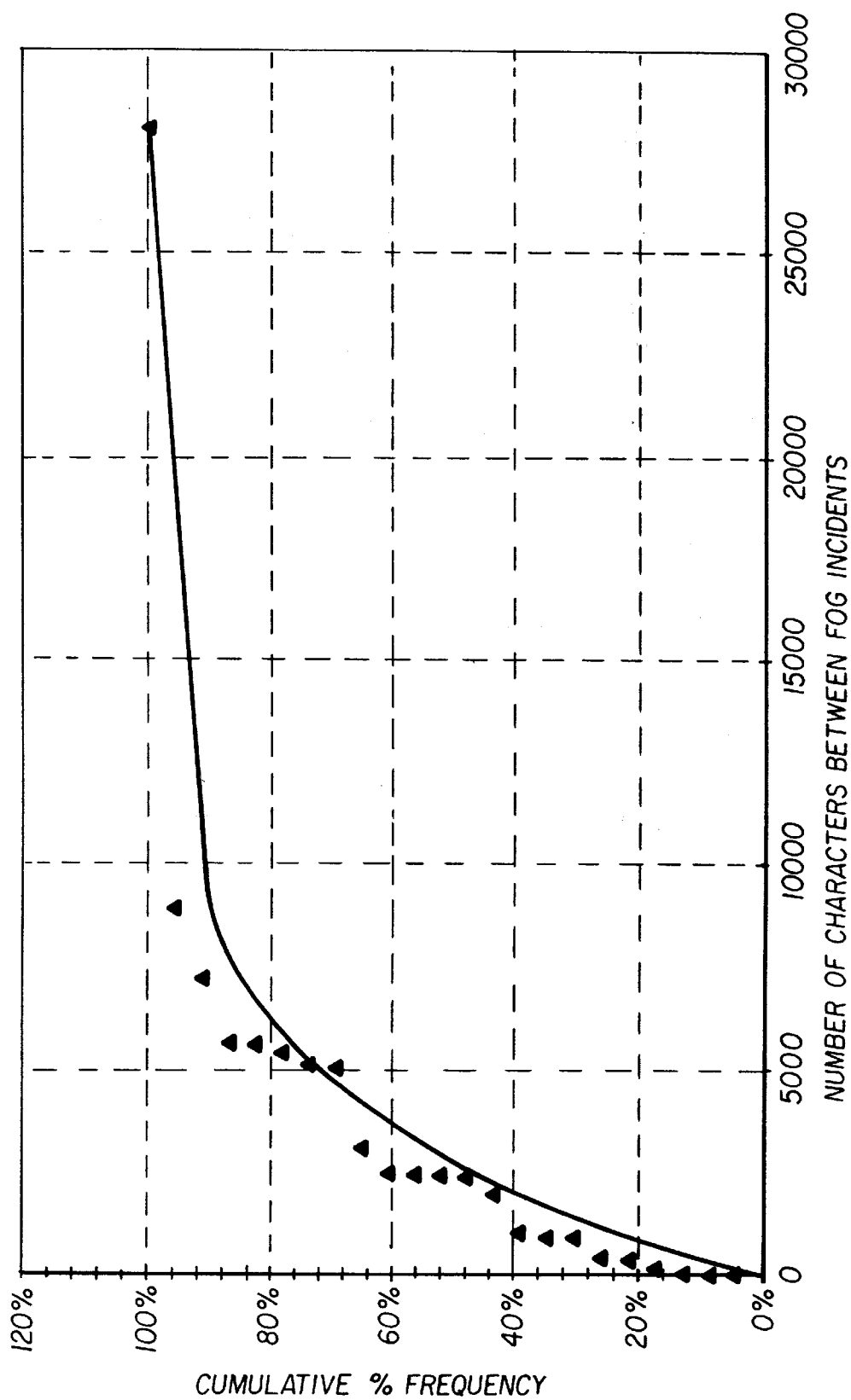
FIGS. 4 and 5 show the effects of an attenuating screen of the invention on incidents of fog spots; and, FIG. 6 is an isometric view of the nozzle element used in the apparatus of the invention.
Figure 5:
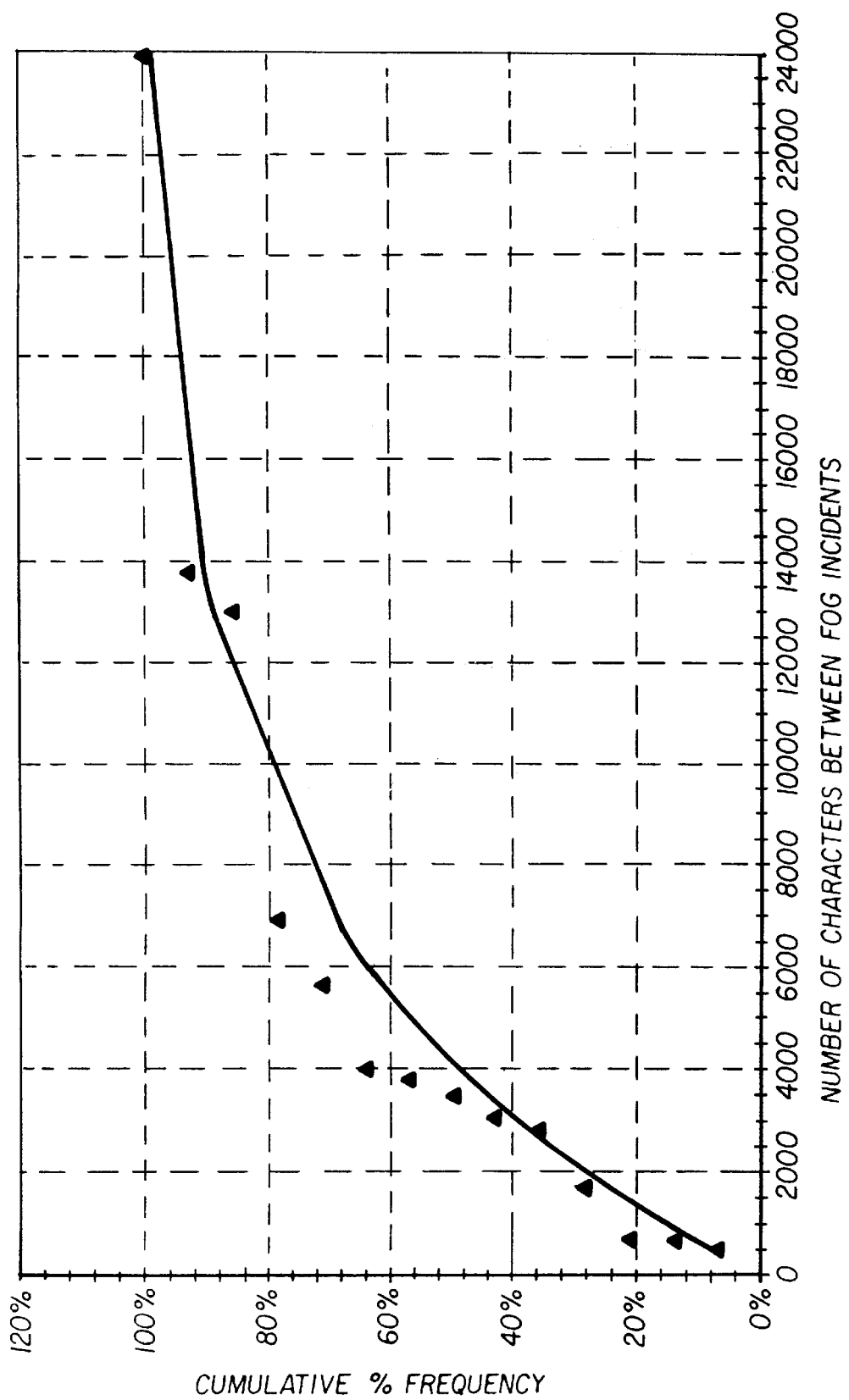

Referring to FIGS. 4 and 5, performance of mesh screens 30 used as laser beam attenuating member 26 in the apparatus 10 of the invention are illustrated. According to both FIGS. 4 and 5, the incidences of fog spots are well below expected levels generally experienced in the industry.

In another embodiment of the invention, a method of controlling peak power of a laser marking apparatus 10 (FIG. 1) adapted for marking predetermined indicia 2 on a moving photosensitive web material 1 comprises the steps of providing a source 12 of laser energy. A laser printing means 14 (described above) is structurally connected to the source 12 of laser energy which has a laser head 16, a laser beam tube 18 connected to the laser head 16. As indicated above, the laser beam tube 18 has an active end 20 and a nozzle element 40 arranged on the active end 20 positioned proximate to the moving photosensitive web material 1. A plurality of lasers 22 is disposed in the laser head 16 for generating a plurality of laser beams. A lens 49 is arranged in the laser beam tube 18, preferably near the active end 20, for focusing each one of the plurality of laser beams along a predetermined optical path 23 (FIG. 2a) and into impinging contact with the moving photosensitive web material 1 thereby producing indicia 2 thereon.

Further, the source 12 of laser energy is activated so as to energize each one of the plurality of lasers 22 for impinging laser beams forming predetermined indicia 2 on the moving photosensitive web material 1. Importantly, the peak power to each one of the plurality of lasers 22 is controlled, as described above, for minimizing fog spots on the photosensitive web material 1.

The invention has been described with reference to a preferred embodiment. However, it will be appreciated that variations and modifications can be effected by a person of ordinary skill in the art without departing from the scope of the invention.

PARTS LIST 1 photosensitive web material
2 indicia
10 apparatus of the invention
12 source of laser energy
14 printer means
16 laser head
18 laser beam tube
20 active end of laser beam tube 18
22 lasers
23 optical path
26 means for controlling peak power or laser beam attenuating member
27 beam splitter
30 metallic mesh screen
32 openings in metallic mesh screen 30
40 nozzle element
42 chamber
44 laser energy inlet end
46 laser energy outlet end
47 lip
48 air jet member
49 lens
50 lens cleaning member
52 vacuum inlet port
54 vacuum outlet port

What is claimed is:

1. Laser apparatus for marking indicia on a moving photosensitive web, comprising:
   a source of laser energy;
   laser printer means operably connected to said source of laser energy, said laser printer means being provided with:
      a laser head having a plurality of lasers disposed therein for generating a plurality of laser beams;
      a laser beam tube connected to said laser head, said laser beam tube having an active end; and,
      a generally cylindrical chamber defining a nozzle element substantially enclosing said laser beam tube, said nozzle element extending circumferentially about said laser beam tube and having a laser energy inlet end and laser energy output end opposite said laser energy inlet end, said laser energy outlet end being configured for concentrating beams of radiation onto said moving web;
      an air jet member arranged in said generally cylindrical chamber for directing a burst of air onto a laser beam impingeable surface;
      at least one lens arranged in said generally cylindrical chamber for focusing each one of a plurality of laser beams passing through said generally cylindrical chamber along a predetermined optical path through said laser beam tube and into impinging contact with said moving photosensitive web;
      a lens cleaning member arranged in said generally cylindrical chamber proximate to said at least one lens;
      a vacuum port extending from said generally cylindrical chamber, said vacuum port providing means for evacuating said generally cylindrical chamber of smoke and debris generated during laser marking; and, and,
      means for controlling peak power to each one of said plurality of lasers, said means comprising a laser beam attenuating member disposed in said predetermined optical path and removed from said nozzle element for attenuating said plurality of laser beams.

2. The apparatus recited in claim 1 wherein said laser beam attenuating member comprises a metallic mesh screen.

3. The apparatus recited in claim 2 wherein said metallic mesh screen is made from materials selected from the group consisting of brass, steel, copper, and metal alloys.

4. The apparatus recited in claim 2 wherein said mesh screen has a plurality of openings each one of said plurality of openings having a wire diameter in the range of from about 0.00025 inches (0.000635 cm) to about 0.025 inches (0.0625 cm) and a clear opening having a dimension in the range from about 0.001 inches (0.00254 cm) to about 0.100 inches (0.254 cm).

5. The apparatus recited in claim 2 wherein said mesh screen has a plurality of openings each one of said plurality of openings having clear opening dimension of 0.055 inches (0.140 cm), and a wire diameter of 0.016 inches (0.041 cm).

6. The apparatus recited in claim 1 wherein said laser energy outlet end has a generally conical shape.

* * * * *